United States Patent [19]

Sawamura et al.

[11] Patent Number: 4,939,531
[45] Date of Patent: Jul. 3, 1990

[54] AUTOMATIC FILM LOADING CAMERA

[75] Inventors: Masataka Sawamura; Minoru Yamada; Yasushi Hoshino; Hiroyuki Horiuchi; Makoto Yoshida; Kenji Miyama; Tsuyoshi Kakita; Keiko Nishihaba, all of Hachioji, Japan

[73] Assignee: Konica Corporation, Tokyo, Japan

[21] Appl. No.: 366,909

[22] Filed: Jun. 15, 1989

[30] Foreign Application Priority Data

Jun. 17, 1988 [JP] Japan .............................. 63-148012
Sep. 6, 1988 [JP] Japan .............................. 63-221413

[51] Int. Cl.⁵ .............................................. G03B 1/12
[52] U.S. Cl. .................................................. 354/173.1
[58] Field of Search ....................................... 354/173.1

[56] References Cited

U.S. PATENT DOCUMENTS

4,816,852 3/1989 Kimura .......................... 354/173.1

Primary Examiner—Michael L. Gellner
Attorney, Agent, or Firm—Finnegan, Henderson, Farabow, Garrett, and Dunner

[57] ABSTRACT

An automatic patrone loading camera includes a patrone chamber, a rotating shaft, a detector, and a control section. The patrone chamber houses a patrone. A film is inserted in the patrone in the winding shaft direction while the film is wound around the outer surface of the patrone. When the patrone is housed in the patrone chamber, the rotating shaft is engaged with a winding shaft of the patrone so as to rotate the winding shaft. The detector detects an extracted state of a leader portion of the film. The control section controls a rotating direction of the rotating shaft on the basis of a detection value from the detector.

10 Claims, 9 Drawing Sheets

AUTOMATIC FILM LOADING CAMERA

BACKGROUND OF THE INVENTION

The present invention relates to an automatic film loading camera capable of loading a patrone while a film end is wound around the patrone.

In cameras, with the advancement of automatic film loading techniques, an automatic loading mechanism has been widely employed. According to this mechanism, the rear cover of a camera is opened to put a patrone in a patrone chamber, the distal end of a film is extracted, and the rear cover is closed. Thereafter, when a shutter button is depressed, the film is automatically fed to the first frame. Recently, automatic film loading cameras capable of loading a film while the film end is wound around a patrone have been proposed. For example, Japanese Patent Laid-Open (Kokai) No. 62-165636 discloses a camera wherein a patrone is rotated by a patrone rotating mechanism in a direction to loosen a film, and the film end is guided to an exposing section along a guide surface formed on the inner surface of a patrone chamber. In addition, Japanese Patent Laid-Open (Kokai) No. 62-201428 discloses a camera in which the patrone rotating mechanism has an eccentric mechanism.

According to the former system, however, if a film end has a strong curling tendency, the film end is not necessarily inserted in the exposing section. In the latter system, since the eccentric mechanism is used, the number of components is increased, and the system is complicated.

SUMMARY OF THE INVENTION

The present invention has been made in consideration of the above situation, and has as its object to provide an automatic film loading camera capable of reliably loading a film with a simple construction.

In order to achieve the above object, there is provided an automatic film lading camera comprising a patrone chamber for housing a patrone, a rotating shaft which is engaged with a winding shaft of the patrone so as to rotate the winding shaft when the patrone is housed in the patrone chamber, detecting means for detecting an extraction state of a leader portion of a film, and rotating shaft driving means for rotating the rotating shaft in a direction to rewind the film upon loading of the patrone so as to rewind the film when the film is extracted by a predetermined length or more, and rotating the rotating shaft in a direction to wind up the film after the film is rewound to a predetermined position, wherein a film end is guided to an exposing section by rotating the patrone in the direction to wind up the film upon rotation of the rotating shaft in the film wind-up direction.

BRIEF DESCRIPTION OF THE DRAWINGS

FIGS. 4A to 7B are views for explaining an operation of the embodiment;

DETAILED DESCRIPTION OF THE PREFERRED EMBODIMENTS

The present invention will be described below with reference to the accompanying drawings.

Figure 1:
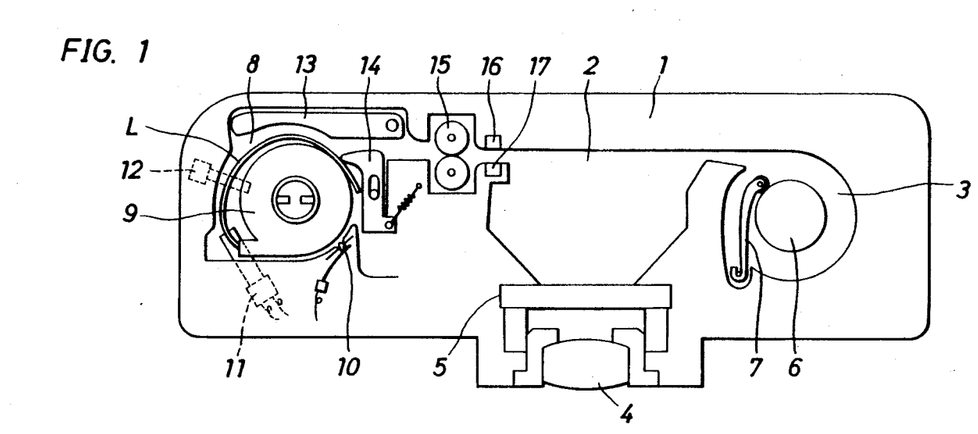
FIG. 1 is a schematic diagram showing an automatic film loading camera according to an embodiment of the present invention.

FIG. 1 is a schematic top diagram of an automatic film loading camera according to an embodiment of the present invention, from which a cover of a camera main body is detached.

Referring to FIG. 1, reference numeral 1 denotes a camera main body; 2, a film exposing section; 3, a film take-up chamber; 4, photographing lens; 5, a shutter; 6, a film take-up reel; and 7, a film guide.

Figure 2:
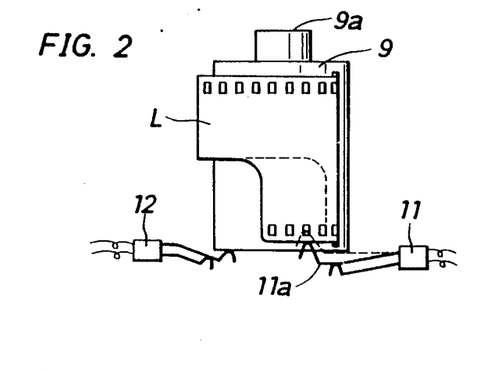
FIG. 2 is a view showing a positional relationship between a leader end detecting switch, a patrone detecting switch, and a patrone.

Reference numeral 8 denotes a patrone chamber in which a patrone 9 is housed; 10, a DX contact for detecting DX data appended to the patrone 9; 11, a leader end detecting switch for detecting the end of a leader L of a film; and 12, a patrone detecting switch for detecting the presence/absence of a patrone. The switches 11 and 12 are arranged below the patrone 9, as shown in FIG. 2. The leader end detecting switch 11 is turned on when a contact 11a is urged by an edge portion of a film. Therefore, when only the leader L of a film is extracted from the patrone 9, the switch 11 is OFF. When the film is further extracted, the switch 11 is turned on. When the patrone 9 is loaded in the patrone chamber 8, the patrone detecting switch 12 is ON. When the patrone 9 is not loaded, the switch 12 is OFF.

In addition, referring to FIG. 1, reference numeral 13 denotes a patrone press member for fixing the patrone 9 in position and preventing reversal of the patrone; 14, a patrone ratchet for guiding the distal end of a film to the film exposing section 2; 15, a film feed roller pair; 16, a photodiode; and 17, a film feed detecting LED. The photodiode 16 and the LED 17 are arranged at a position corresponding to the perforations of the leader L of a film. The photodiode 16 outputs pulse signals of a number corresponding to that of perforations passing therethrough. With this operation, the feed amount of a film can be detected (for example, in a 35-mm film, eight perforations correspond to one frame).

Figure 3A:
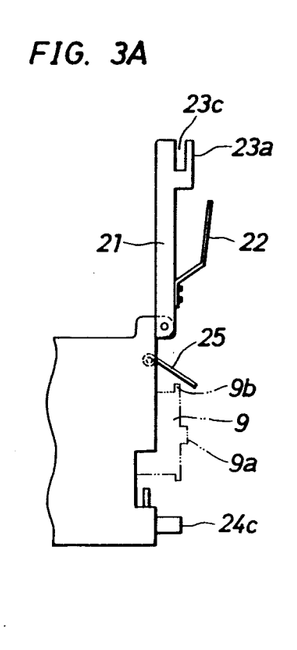
FIGS. 3A and 3A are schematic diagrams showing a patrone chamber in a state wherein a lid of a patrone chamber and a cover of a camera main body are attached.
Figure 3B:
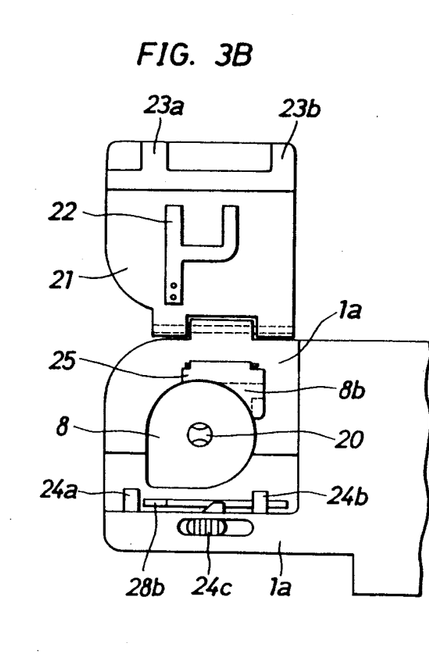

FIGS. 3A and 3B are views showing the patrone chamber 8 in a state wherein a cover 1a of the camera main body is attached, in which FIG. 3A is a side view and FIG. 3B is a plan view. A rewinding shaft 20 to be engaged with a spool (winding shaft) of the patrone 9 is arranged at the bottom portion of the patrone chamber 8. Reference numeral 21 denotes a lid of the patrone chamber 8; 22, a patrone press spring mounted on the lid 21; 23a and 23b, lock portions of the lid 21; 24a and 24b, lock pawls respectively engaged with grooves 23c of the lock portions 23a and 23b to lock the lid 21; 24c, a lock button; and 25, an opening cover for positioning a patrone upon loading.

Figure 4A:
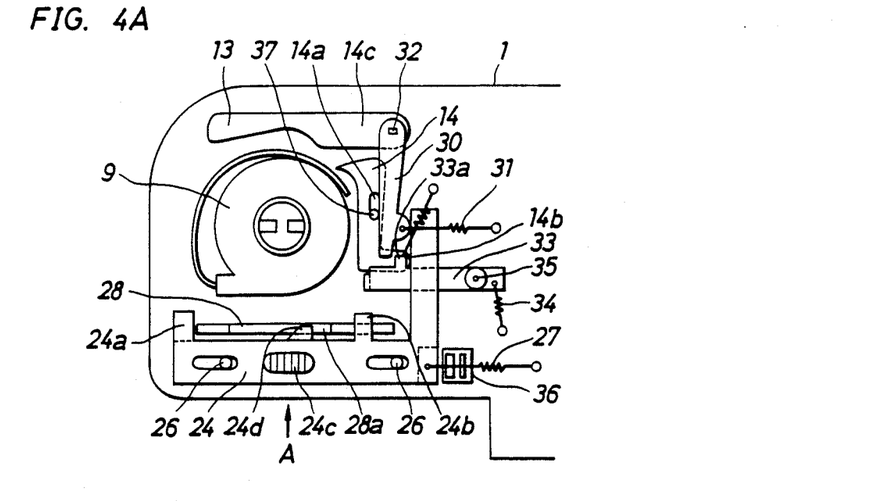

FIG. 4A is a plan view showing the patrone chamber with the cover of the camera main body being detached. In FIGS. 4A to 7B, the wall of the patrone chamber is omitted.

Referring to FIG. 4A, reference numeral 24 denotes a lock lever having the lock pawls 24a and 24b and the lock button 24c. The lock lever 24 is guided by a guide pin 26 and can be moved in the lateral direction in FIG. 4A. The lock lever 24, however, is normally biased by a spring 27 in the right direction in FIG. 4A. Reference numeral 28 denotes a stop lever for stopping the lock lever 24 at an opening position. A stop lever 28 is biased clockwise about a shaft 30 by a spring 29. Reference numeral 30 denotes a coupling lever which is coupled to the patrone press member 13 and is biased counterclockwise about a shaft 32 by a spring 31; and 33, a patrone press lock. The coupling lever 30 is stopped by a stop portion 33a of the patrone press lock 33 (see FIG. 5A). The lock 33 is biased clockwise about a shaft 35 by a spring 34. Reference numeral 36 denotes an opening/closing switch for detecting opening/closing of the lid 21.

An elongated groove 14a is formed in the patrone ratchet 14. A shaft 37 formed on the main body 1 is inserted in the elongated groove 14a. The patrone ratchet 14 is biased counterclockwise about the shaft 37 by a spring 38.

The circumferential length of the patrone from a distal end 14c of the patrone ratchet 14 and the contact 11a of the leader end detecting switch 11 is set to be slightly smaller than the length of the leader L of a film. As will be described below, therefore, while the leader L of a film is clamped by the distal end 14c of the patrone ratchet (see FIG. 1), the switch 11 is kept ON. When the film end slips off from the distal end 14c of the ratchet 14 (see FIG. 5), the switch 11 is turned off. Although the lengths of the leader portions L slightly differ from each other depending on film manufacturers, they are determined by International Standards Organization (ISO 1007). The standard of a 135-mm film patrone is 47.5 to 38 mm. Therefore, if the circumferential length of a patrone from the distal end 14c of the ratchet 14 to the contact 11a of the switch 11 is set to be longer than the length of a leader portion of a film determined by the standard, a film of any manufacturer can be equally used.

The operation of the embodiment will be described below.

Figure 4B:
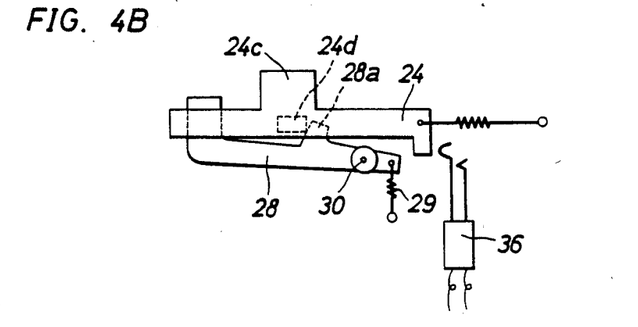

FIGS. 4A and 4B show a state wherein the lid 21 is opened, in which FIG. 1A is a plan view and FIG. 1B is a view showing the lock lever 24 and the stop lever 28 when viewed from a direction indicated by an arrow A in FIG. 4A.

When the lock lever 24 is slid in the left direction in FIG. 4A by depressing the lock button 24c with a finger while the lid 21 is closed (a state shown in FIG. 5B), a pawl 24d of the lock lever 24 is detached from a stop pawl 28a of the stop lever 28, and the stop pawl 28a is moved upward by the spring 29. Although the lock lever 24 is pulled rightward by the spring 27, the pawl 24d is stopped by the stop pawl 28a, and the lock lever 24 is stopped at that position (see FIG. 4B). As a result, the lock pawls 24a and 24b of the lock lever 24 are detached from the lock portions 23a and 23b, and the lid 21 is opened. At this time, an end 14b of the patrone ratchet 14 is urged by the lock lever 24, and the patrone ratchet 14 is rotated clockwise. As a result, the distal end 14c of the patrone ratchet 14 is retracted to a position separated from the patrone 9, thereby facilitating loading of the patrone 9.

A patrone loading portion has an opening shape shown in FIG. 3B and is constituted by the patrone chamber 8 and the opening cover 25. The opening cover 25 is supported by a main body cover 1a so as to be pivoted outward from the patrone chamber 8, and is normally brought into contact with the main body cover 1a by a spring (not shown). Since the movement of the patrone 9 during loading is limited to a direction shown in FIG. 4A, the positional relationship between the leader end detecting switch 11 and the leader L of a film can be reliably restricted.

The coupling lever 30 is locked by the patrone press lock 33, and the patrone press member 13 coupled to the coupling lever 30 stands by at a position separated from the patrone 9.

Figure 5A:
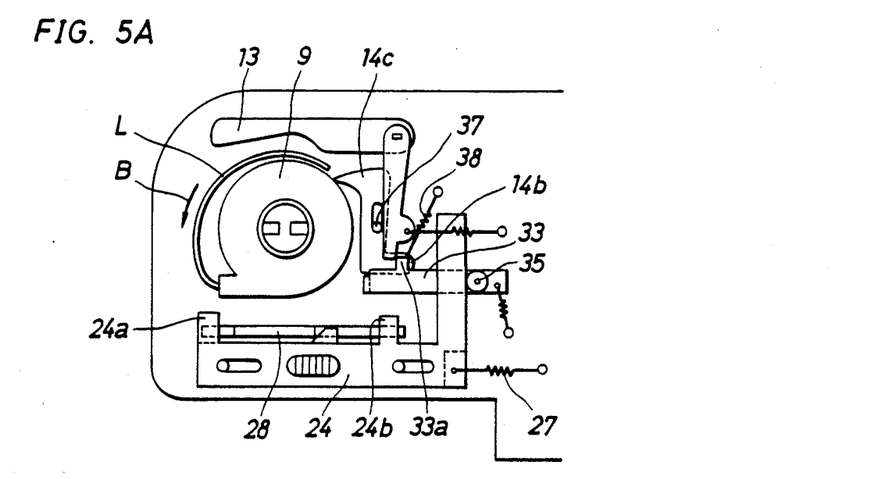
Figure 5B:
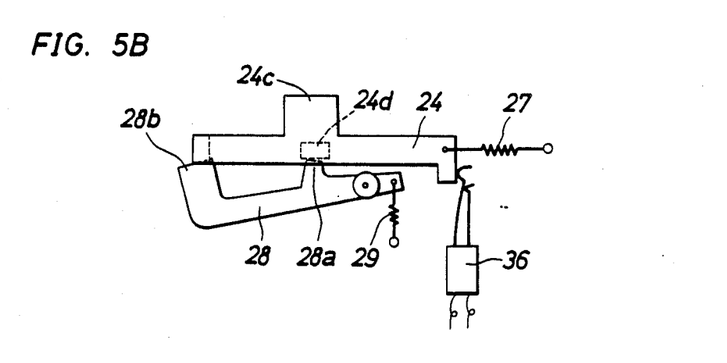

When the lid 21 is closed after the patrone 9 is loaded in the patrone chamber, a distal end 28b of the stop lever 28 is urged by the lock portion 23a (see FIG. 3B) of the lid 21 to be moved downward, as shown in FIG. 5B. As a result, the lock lever 24 is disengaged from the stop lever 28, and the lock lever 24 is pulled by the spring 27 to be slid rightward in FIG. 5B. Subsequently, the lock pawls 24a and 24b of the lock lever 24 are engaged with the lock portions 23a and 23b of the lid 21, and the lid 21 is locked. At the same time, the opening/closing switch 36 is turned on, and hence it is detected that the lid 21 is closed.

As shown in FIG. 5A, when the lock lever 24 is separated from the end 14b of the patrone ratchet 14, the patrone ratchet 14 is pulled by the spring 38 to be pivoted counterclockwise about the shaft 37, and the distal end 14c is brought into contact with the film wound around the patrone 9. At this time, the patrone press member 13 stands by at a position separated from the patrone 9.

When the length of the film leader L exceeds a predetermined value, the film is rewound (in a direction indicated by an arrow B in FIG. 5A) by the rewinding shaft 20 (see FIG. 3B). When the distal end of the film is separated from the patrone ratchet 14, the leader end of a film F is detected and the end detecting switch 11 is turned off. As a result, the rewinding shaft 20 is reversed to be rotated in the direction to wind up the film. When the length of the film leader L is less than the predetermined value, the rewinding shaft 20 is not rotated in the rewinding direction but is rotated in the winding direction. Although the film is tightly wound around the spool of the patrone, when the spool is reversed, the film is loosened and extends outward to a patrone cylinder, and the patrone 9 is rotated clockwise. At this time, the distal end of the film is guided by the patrone ratchet 14 and is reliably fed to the film feed roller pair 15 (see FIG. 1).

Figures 6A, 6B:
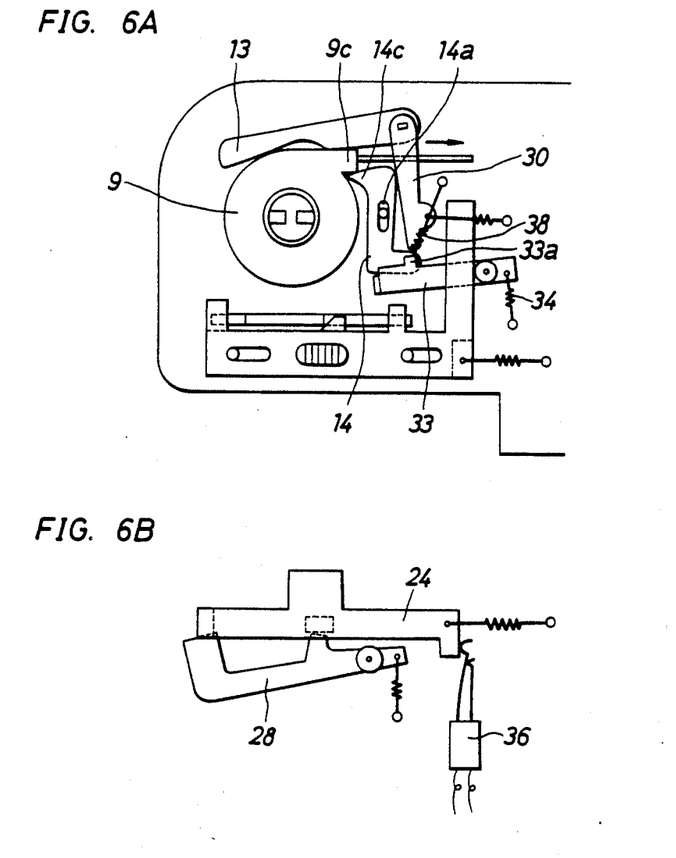

When the patrone 9 is further rotated, a film feed portion 9c is brought into contact with the distal end 14c of the patrone ratchet 14, thus pushing the patrone ratchet 14 upward against the biasing force of the spring 38, as shown in FIG. 6A. The patrone ratchet 14 is moved downward along the elongated groove 14a so as to push the patrone press lock 33 downward against the biasing force of the spring 34. As a result, the coupling lever 30 is released from the stop portion 33a of the patrone press member 33, and the patrone press member 13 urges the patrone 9. When the patrone 9 is fixed by the patrone press member 13, feeding of the film and reading of the DX data can be stabilized. At this time, the patrone is located at the film feed position.

When the distal end of the film is fed to the film feed roller pair 15, the film is extracted by the roller pair 15 and is fed to the film exposing section 2 through the photodiode 16 and the LED 17 so as to be taken up by the film taken-up reel 6. When the photodiode 16 detects that the film is fed by three frames, automatic loading is completed.

Subsequently, the film is wound up every photographing operation. When all the photographing operations are completed, the film is rewound. During this period, each component is kept in a state shown in FIG. 6A.

During a film rewinding period, the rewinding shaft 20 is rotated in the rewinding direction, and the patrone 9 tends to pivot toward the position assumed upon loading of the patrone 9 (shown in FIG. 4A). However, since the patrone press member 13 as a reversal preventing member is brought into contact with the film feed portion 9c of the patrone 9 so as to prevent reversal of the patrone. Therefore, the film feed portion 9c and the feed direction of the film are not shifted from each other, and the film can be reliably rewound.

Figure 7A:
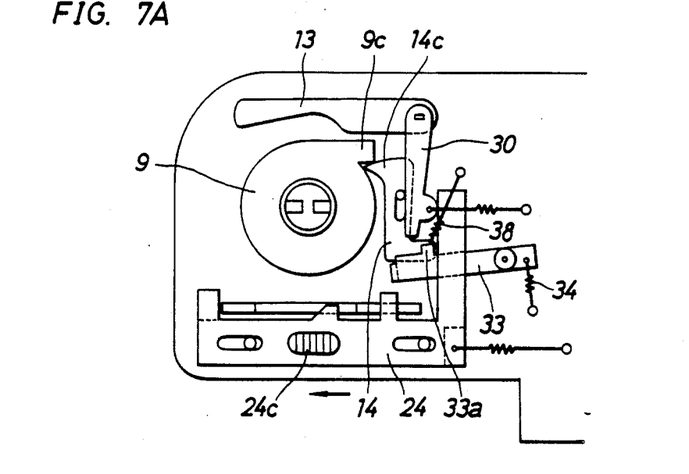
Figure 7B:
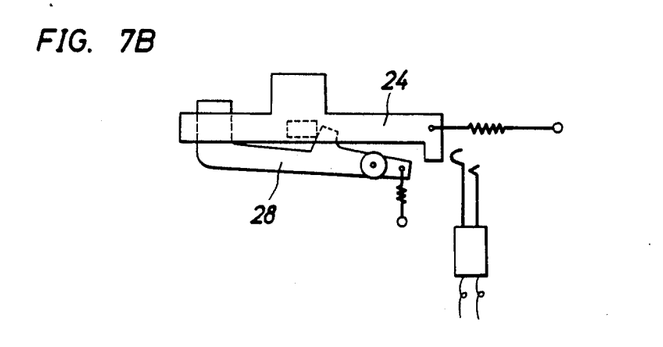

FIGS. 7A and 7B show a state wherein the lid 21 is opened upon completion of a film rewinding operation. When the lock button 24c is depressed and the lock lever 24 is moved leftward, the lid 21 is kept open in the same manner as described with reference to FIG. 4A. At this time, if a shaft 9a of the patrone 9 is picked up and extracted, the opening cover 25 is pushed upward by an end portion 9b of the patrone 9 (see FIG. 3A), and the patrone 9 can be extracted while its direction is kept unchanged from the state obtained upon completion of rewinding. Therefore, the direction of the patrone 9 need not be changed, and the operation is facilitated. The coupling lever 30 is pushed by the lock lever 24 and is separated from the patrone 9. When the patrone 9 is extracted, the film feed section 9c of the patrone 9 is disengaged from the distal end 14c of the patrone ratchet 14, and the patrone ratchet 14 is pulled by the spring 38 to be moved upward. With this movement, the patrone press lock 33 is pulled by the spring 34 to be moved upward, and the coupling lever 30 is stopped by the stop portion 33a. As a result, each component is set in the same state as in FIG. 4A.

Figure 8:
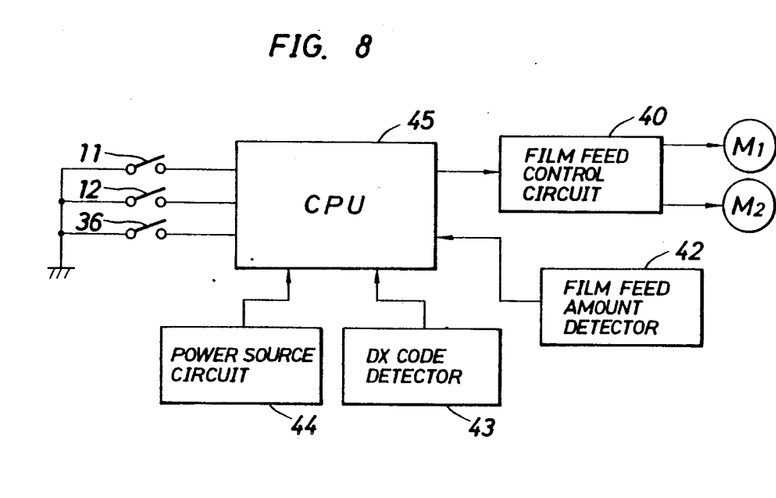
FIG. 8 is a block diagram showing a control system of the embodiment.

FIG. 8 is a block diagram showing a control system of the embodiment. The same reference numerals in FIG. 8 denote the same parts as in the above-described drawings.

Referring to FIG. 8, reference numeral 40 denotes a film feed control circuit for driving feed motors M1 and M2 through a coupling mechanism such as a gear. The film feed roller pair 15 and the reel 6 shown in FIG. 1 are driven by the motor M2 through a coupling mechanism such as a gear. Reference numeral 42 denotes a film feed amount detector, having the photodiode 16 and the LED 17 shown in FIG. 1, for outputting a signal corresponding to a film feed amount; 43, a DX code detector having the DX contact 10 (see FIG. 1); 44, a power source circuit; and 45, a CPU for controlling an operation timing of each circuit.

Figure 9:
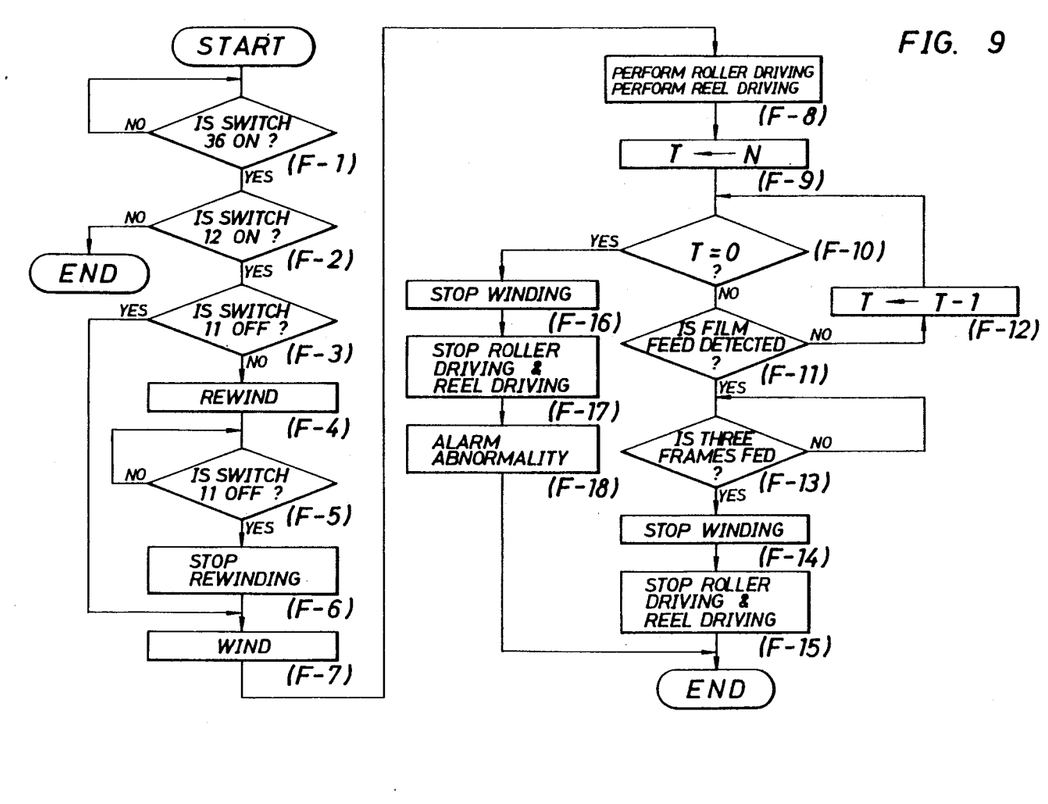
FIG. 9 is a flow chart for explaining an operation of the control system.

An operation of this control system will be described below with reference to a flow chart in FIG. 9.

When the lid 21 is opened and the patrone 9 is inserted in the patrone chamber 8 or the lid 21 is closed without inserting the patrone 9, the CPU 45 checks whether the opening/closing switch 36 is ON or OFF (F-1). If the switch 36 is ON, i.e., the lid 21 is closed, the CPU 45 checks the patrone detecting switch 12 (F-2). At this time, if the patrone 9 is not inserted, the switch 12 is kept OFF, and the sequence is ended. If the patrone 9 is inserted, the switch 12 in ON. As a result, the flow advances to the next sequence step, and the CPU 45 checks whether the leader end detecting switch 11 is ON or OFF (F-3). If the switch 11 is ON, the motor M1 is driven to drive the rewinding shaft 20 in the rewinding direction (F-4). When the switch 11 is turned off, i.e.g, the film F is rewound with the leader L being left outside the patrone and the distal end of the film F is separated from the distal end 14c of the patrone ratchet 14, the rewinding operation is stopped (F-6). If the switch 11 is OFF in step F-3, a rewinding operation is not performed. Subsequently, the motor M1 is reversed, the rewinding shaft 20 is driven in the winding direction (F-7), and at the same time, the motor M2 is rotated to drive the film feed roller pair 15 and the reel 6 in the winding direction (F-8). A predetermined time N is set in a counter T (F-9), and it is checked whether the predetermined N has elapsed (F-10). If NO is obtained in this step, it is checked whether a film feed is detected by the film feed amount detector 42 (F-11). That is, the photodiode 16 is kept ON while the film does not shield light from the LED 17. When the film is fed, perforations of the film shield light from the LED 17, and the photodiode 16 is repeatedly turned on and off. If a film feed is not detected, the counter T is decremented (F-12), and the flow returns to step F-10. If a film feed is detected, it is determined whether the film is fed by three frames (F-13). When the film is fed by three frames, the motors M1 and M2 are stopped (F-14 and F-15), thereby completing the automatic loading operation. If the predetermined time N elapses during a film winding period without detecting a film feed (F-10), driving of the winding roller pair and the reel is stopped (F-16 and F-17), and an abnormality alarm is provided by a certain display/alarm means (F-18).

In the above-described embodiment, the patrone ratchet 14 is used to guide a film end to the exposing section 2. However, a film end may be guided by the inner surface of the patrone chamber 8 to advance into the exposing section 2 without specially forming the patrone ratchet 14. If the guide member (patrone ratchet 14) as in the embodiment is arranged, a film end can be further reliably guided to the exposing section.

In some single-focus cameras, a lens barrel can be retracted in an exposing chamber of a camera main body while they are not used. If a lens barrel is housed in a camera to flatten its front surface, the camera can be easily handled while it is not used. However, when application of the present invention to a camera of this type is considered, since a photographing lens enters an exposing chamber, if a film is loaded with a lens barrel being housed and the film has a strong curling tendency, its leader portion may enter the exposing chamber to be brought into contact with the photographing lens, thus damaging the lens.

Figure 10:
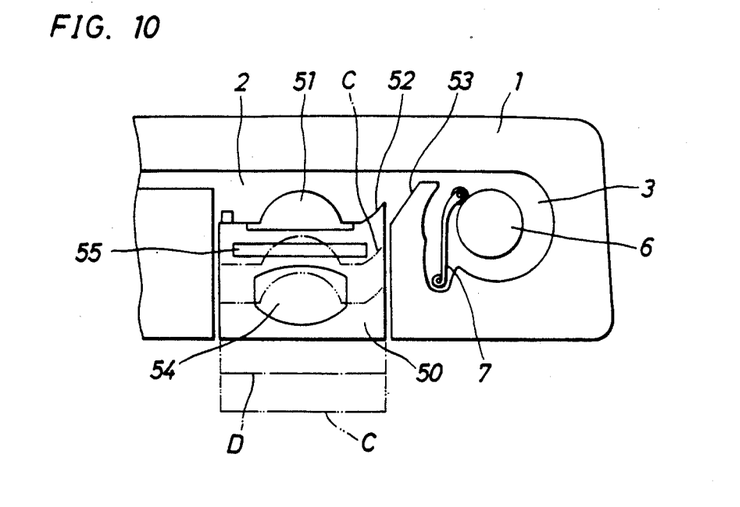
FIGS. 10 and 11 are schematic diagrams showing other embodiments.

FIG. 10 is a schematic diagram showing a camera capable of solving such an inconvenience. The same reference numerals in FIG. 10 denote the same parts as in the above drawings.

Referring to FIG. 10, reference numeral 50 denotes a lens barrel which can be extracted/housed from/in a camera main body 1. In FIG. 10, a solid line indicates a position at which the lens barrel 50 is housed, and an alternate long and dashed line C indicates a position during a photographing operation. The lens barrel 50 is driven by, e.g., a lens barrel driving motor through a gear system.

If a film is loaded while the lens barrel 50 is kept at the housing position indicated by the solid line, the distal end of the film is brought into contact with a rear lens 51, and the lens may be damaged or an automatic loading error tends to occur. For this reason, during such a period, the lens barrel is caused to advance to a position indicated by an alternate long and dashed line D in FIG. 10 so as to move the lens, thereby preventing the film end from being brought into contact with the lens. An inclined surface 52 is formed at the read end portion of the lens barrel 50, and an inclined surface 53 having the same inclination as that of the surface 52 is formed at a portion on the main body side near the lens barrel 50. When the lens barrel 50 reaches the position indicated by the alternate long and dashed line D, the two surfaces 52 and 53 are located on the same plane. Therefore, the film end is guided by the surfaces 52 and 53 to be fed to a film take-up chamber 3. Each inclined surface preferably has an an inclination of 30 degrees or more with respect to the optical axis of the lens. Referring to FIG. 10, reference numeral 54 denotes a photographing lens; and 55, a shutter driving mechanism.

Figure 11:
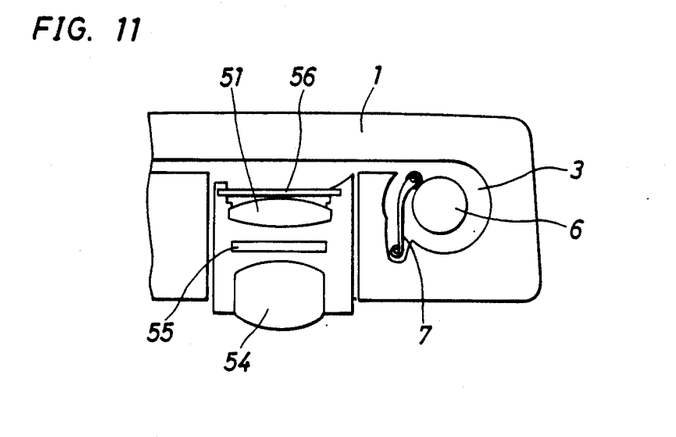

FIG. 11 shows a case wherein the present invention is applied to a zooming camera. The same reference numerals in FIG. 11 denote the same parts as in FIG. 10. In a zooming camera, since the inclined surfaces 52 and 53 each having an inclination of 30 degrees or more cannot be arranged as shown in FIG. 10 at a long focal point, a rear lens 51 is covered with a plane lens 56 to be protected from damages.

As has been described above, according to the present invention, the winding shaft of a patrone is temporarily rotated in the rewinding direction to rewind a film. When the film is rewound by a predetermined length, the winding shaft is rotated in the winding direction to shorten the extracted portion of the film to a predetermined length. Thereafter, the end of the film is guided to an exposing section. With this operation, even if a film end has a strong curling tendency, the film can be reliably fed to the exposing section of a camera. In addition, since a complex eccentric mechanism need not be used as in the conventional apparatus, film loading can be reliably performed with a simple arrangement.

What we claim is:

1. An automatic film loading camera comprising:
   a patrone chamber for housing a patrone, a film being inserted in the patrone in a winding shaft direction thereof while the film is wound around an outer surface of the patrone;
   a rotating shaft, engaged with a winding shaft of the patrone when the patrone is housed in said patrone chamber, for rotating the winding shaft;
   detecting means for detecting an extracted state of a leader portion of the film; and
   control means for controlling a rotating direction of said rotating shaft on the basis of a detection value from said detecting means.

2. An automatic film loading camera comprising:
   a patrone chamber for housing a patrone;
   a rotating shaft, engaged with a winding shaft of the patrone when the patrone is housed in said patrone chamber, for rotating the winding shaft;
   detecting means for detecting an extracted state of a leader portion of a film;
   driving means for rotating said rotating shaft upon loading of the patrone;
   control means for controlling said driving means to rotate said rotating shaft in a film rewinding direction to rewind the film to a predetermined length when a detection value obtained by said detecting means is more than the predetermined length and thereafter rotate said rotating shaft in a film winding direction, and to rotate said rotating shaft in a film winding direction when the detection value obtained by said detecting means is less than the predetermined length, thereby rotating the patrone from a position assumed at the time of loading to a film feed position; and
   means for guiding a film end to an exposing section of said camera when the patrone is rotated from the position assumed at the time of loading to the film feed position.

3. A camera according to claim 2, wherein said patrone chamber is designed to allow a patrone to be inserted therein in a winding shaft direction thereof while a film is wound around an outer surface of the patrone, said patrone chamber having an opening portion to determine the position of the patrone.

4. A camera according to claim 2, wherein said guide means comprises a guide member which is brought into contact with an outer surface of a patrone upon loading of the patrone so as to guide a film end to the exposing section of said camera while the patrone is rotated to the film feed position.

5. A camera according to claim 2, further comprising reversal preventing means for preventing a patrone from returning to the position assumed at the time of loading when the patrone is rotated to the film feed position.

6. A camera according to claim 5, said reversal preventing means comprises means which is brought into contact with a film feed portion of the patrone so as to prevent reversal of the patrone.

7. A camera according to claim 2, wherein said detecting means comprises means for detecting an edge portion of a film to detect an extracted state of a leader portion.

8. A camera according to claim 7, wherein a length along a circumference of a patrone in the film winding direction from said detecting means to a contact position of said guiding means with the outer surface of the patrone is set to be longer than a length of a leader portion of a film, so that when the leader portion of the film is clamped between the guide member and the outer surface of the patrone, it is detected that the film is extracted by not less than the predetermined length, and when the film end does not reach said guide member, it is detected that the leader portion is extracted by not more than the predetermined length.

9. An automatic film loading camera comprising:
   a patrone chamber for housing a patrone;
   a rotating shaft, engaged with a winding shaft of the patrone when the patrone is housed in said patrone chamber, for rotating the winding shaft;
   detecting means for detecting an extracted state of a leader portion of a film;
   driving means for rotating said rotating shaft upon loading of the patrone;
   control means for controlling said driving means to rotate said rotating shaft in a film rewinding direction to rewind the film to a predetermined length when a detection value obtained by said detecting means is more than the predetermined length and thereafter rotate said rotating shaft in a film winding direction, and to rotate said rotating shaft in a film winding direction when the detection value obtained by said detecting means is less than predetermined length, thereby rotating the patrone from a position assumed at the time of loading to a film feed position;

guide means for guiding a film end to an exposing section of said camera when the patrone is rotated from the position assumed at the time of loading to the film feed position; and reversal preventing means which is operated when said guide means is urged by a film feed portion of a patrone upon rotation of the patrone to the film feed position, thereby preventing the patrone from returning to the position assumed at the time of loading.

10. A camera according to claim 9, wherein said reversal preventing means releases fixation of a patrone by opening a lid of said patrone chamber.

* * * * *